United States Patent
Fujiwara

(10) Patent No.: US 8,922,710 B2
(45) Date of Patent: Dec. 30, 2014

(54) IMAGING APPARATUS WITH COVER MEMBER FOR COVERING AN OPERATION MEMBER

(75) Inventor: Yuya Fujiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 13/209,658

(22) Filed: Aug. 15, 2011

(65) Prior Publication Data

US 2012/0044417 A1 Feb. 23, 2012

(30) Foreign Application Priority Data

Aug. 18, 2010 (JP) ................................. 2010-183273

(51) Int. Cl.
*H04N 5/225* (2006.01)
*G03B 17/00* (2006.01)
*G03B 17/02* (2006.01)
*G03B 17/56* (2006.01)

(52) U.S. Cl.
CPC .............. *H04N 5/2252* (2013.01); *G03B 17/02* (2013.01); *G03B 17/568* (2013.01)
USPC .......................................... 348/375; 396/543

(58) Field of Classification Search
USPC .......... 348/375, 373, 376; 396/312, 535, 536, 396/539, 540, 543
See application file for complete search history.

(56) References Cited

U.S. PATENT DOCUMENTS

| | | | | |
|---|---|---|---|---|
| 4,005,460 A | * | 1/1977 | Mizukawa | 396/299 |
| 4,387,718 A | * | 6/1983 | Bilitz et al. | 607/63 |
| 5,127,603 A | * | 7/1992 | Morimoto | 242/279 |
| 6,700,621 B1 | * | 3/2004 | Seo | 348/375 |
| 7,616,392 B2 | * | 11/2009 | Igarashi et al. | 396/534 |
| 7,738,785 B2 | * | 6/2010 | Misawa | 348/375 |
| 7,796,186 B2 | * | 9/2010 | Oshima | 348/373 |
| 2004/0091260 A1 | * | 5/2004 | Kobayashi | 396/543 |
| 2006/0159444 A1 | * | 7/2006 | Mokunaka | 396/299 |
| 2008/0012962 A1 | * | 1/2008 | Terakado | 348/376 |
| 2008/0012983 A1 | * | 1/2008 | Oshima | 348/375 |
| 2008/0018782 A1 | * | 1/2008 | Terakado et al. | 348/376 |
| 2009/0059064 A1 | * | 3/2009 | Terakado | 348/376 |
| 2012/0044621 A1 | * | 2/2012 | Fujiwara | 361/679.01 |

FOREIGN PATENT DOCUMENTS

| | | | | |
|---|---|---|---|---|
| CN | 101123688 A | | 2/2008 | |
| JP | 60075097 A | * | 4/1985 | |
| JP | 05-037166 A | | 2/1993 | |
| JP | 05037166 A | * | 2/1993 | |
| JP | 08116479 A | * | 5/1996 | |

(Continued)

*Primary Examiner* — John Villecco
(74) *Attorney, Agent, or Firm* — Canon U.S.A., Inc. IP Division

(57) ABSTRACT

An imaging apparatus includes an external connector to which an external microphone may be connected, an operation member located on a surface of the imaging apparatus opposite a surface on which the external connector is located, a dial member located on a surface of the imaging apparatus different from the surface on which the external connector is located and the surface on which the operation member is located, in a state in which a side surface of the dial member is exposed, and a cover member capable of switching between an open state in which the operation member and the side surface of the dial member are exposed and a closed state in which the cover member covers the operation member and the side surface of the dial member. In the imaging apparatus, an operation on the dial member may be prevented by bringing the cover member into the closed state.

12 Claims, 21 Drawing Sheets

(56) References Cited

FOREIGN PATENT DOCUMENTS

| | | | | |
|---|---|---|---|---|
| JP | 2001045348 A | * | 2/2001 | |
| JP | 2001-189883 A | | 7/2001 | |
| JP | 2004069830 A | * | 3/2004 | |
| JP | 2005338181 A | * | 12/2005 | |
| JP | 2007133105 A | * | 5/2007 | |
| JP | 2008022273 A | | 1/2008 | |
| JP | 2008119201 A | * | 5/2008 | |
| JP | 2008211293 A | * | 9/2008 | |
| WO | 2004111822 A | | 12/2004 | |
| WO | 2004111822 A1 | | 12/2004 | |

\* cited by examiner

IMAGING APPARATUS WITH COVER MEMBER FOR COVERING AN OPERATION MEMBER

BACKGROUND OF THE INVENTION

1. Field of the Invention

The present invention relates to an imaging apparatus, such as a digital camera. In particular, the present invention relates to an imaging apparatus including a cover member configured to cover an operation member.

2. Description of the Related Art

Japanese Patent Application Laid-Open No. 2001-189883 discusses a method of allowing a user to execute a setting and a calibration for recording audio information by operating a level operation unit for adjusting the level of a signal from an audio line or a microphone, which is exposed on an outer surface of an imaging apparatus.

However, in the imaging apparatus discussed in Japanese Patent Application Laid-Open No. 2001-189883, because the level operation unit is exposed on the outer surface of the imaging apparatus, the setting value or calibration value of an audio recording operation may be unintentionally changed if any object contacts the level operation unit when the imaging apparatus is in use.

In order to prevent the above-described problem, a conventional method covers an operation member with a cover member that can open and close by a pivot operation. However, according to the conventional method, when the operation member is covered with the cover member, it may become difficult for a user to view a current setting value because the operation member is covered as described above.

Furthermore, if the area of covering the operation member with the cover member is large, it may become necessary to increase the size of the imaging apparatus.

SUMMARY OF THE INVENTION

According to an aspect of the present invention, an imaging apparatus includes an external connector to which an external microphone may be connected, an operation member located on a surface of the imaging apparatus opposite a surface on which the external connector is located, a dial member located on a surface of the imaging apparatus different from the surface on which the external connector is located and the surface on which the operation member is located, in a state in which a side surface of the dial member is exposed, and a cover member capable of switching between an open state in which the operation member and the side surface of the dial member are exposed and a closed state in which the cover member covers the operation member and the side surface of the dial member. In the imaging apparatus, an operation on the dial member may be prevented by bringing the cover member into the closed state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

Figure 1A:
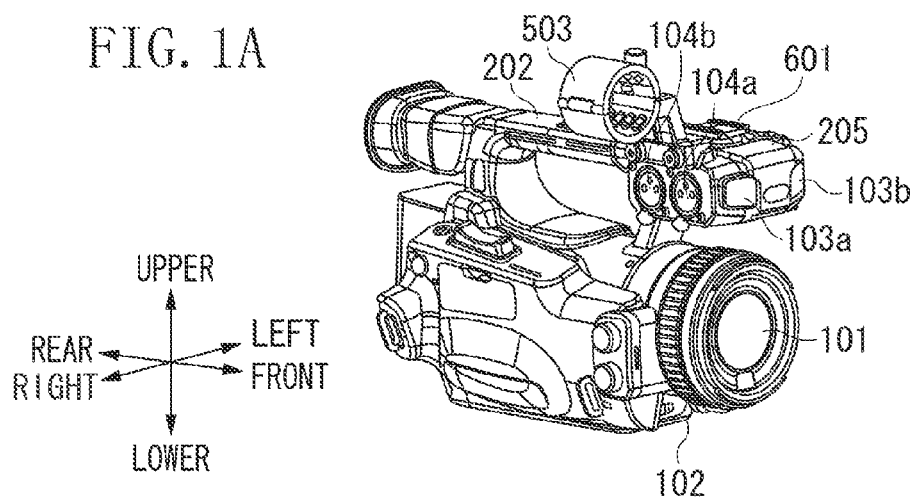
FIGS. 1A through 1C illustrate an external view of a video camera, which is an imaging apparatus according to an exemplary embodiment of the present invention.
Figure 1B:
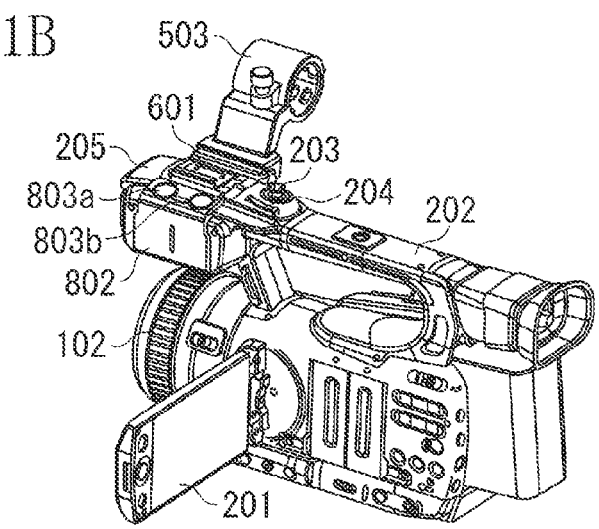
Figure 1C:
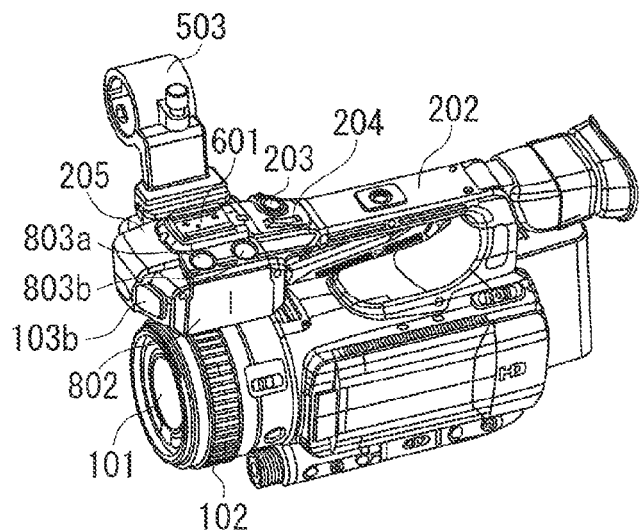

FIGS. 1A through 1C illustrate an external view of a video camera, which is an imaging apparatus according to an exemplary embodiment of the present invention. Referring to FIG. 1A, the video camera according to the present exemplary embodiment includes a photographic lens 101. A rotating operation ring 102 is provided on an outer periphery of the photographic lens 101.

In the present exemplary embodiment, as illustrated in FIG. 1A, the front direction (object side) of the photographic lens 101 along the optical axis is defined as the "front" side. On the other hand, the rear direction (image side) of the photographic lens 101 along the optical axis is defined as the "rear" side.

In addition, the right direction from the photographic lens 101 as viewed from the rear direction of the video camera along the optical axis is defined as the "right" side. On the other hand, the left direction from the photographic lens 101 as viewed from the rear direction of the video camera along the optical axis is defined as the "left" side.

Furthermore, the upward direction, which is directed upwards when the video camera is oriented as illustrated in FIG. 1A, is defined as "upper", while the downward direction, which is directed downwards when the video camera is oriented as illustrated in FIG. 1A, is defined as "lower". Accordingly, FIG. 1A is a perspective view of the video camera as viewed diagonally from the right front side of the video camera.

Referring to FIG. 1A, a handle 202, which is a member used for holding the video camera when transporting the video camera or during shooting, is formed on the photographic lens 101 on the upper surface of the photographic lens 101. The handle 202 extends in the longitudinal direction.

The handle 202 is larger at the front edge thereof than at a holding portion thereof, which is provided around the center of the handle 202. An audio unit 205, to which built-in microphones 103a and 103b configured to capture audio information from an object, is provided on the front edge of the handle 202.

The built-in microphones 103a and 103b are provided on the front surface of the audio unit 205 to be positioned as close to the object as possible during shooting. The built-in microphones 103a and 103b protrude from a light-incident surface of the photographic lens 101.

As described above, the built-in microphones 103a and 103b are provided on the front surface of the audio unit 205. On the other hand, on the right side surface of the audio unit 205, XLR-type external connectors 104a and 104b, to which an external microphone can be connected, are provided in tandem in the longitudinal direction. In the proximity of the external connectors 104a and 104b, a microphone holder 503, which is configured to hold the external microphone, is attached. In addition, in the proximity of the audio unit 205, an accessory shoe 601 is provided.

FIG. 1B is a perspective view of the video camera as viewed diagonally from the left rear side of the video camera. FIG. 1C is a perspective view of the video camera as viewed diagonally from the left front side of the video camera.

Referring to FIGS. 1B and 1C, an openable and closable image display monitor 201 is attached to the left side of the video camera. In the example illustrated in FIG. 1B, the image display monitor 201 is opened. In the example illustrated in FIG. 1C, the image display monitor 201 is closed.

As illustrated in FIGS. 1B and 1C, a trigger key 203 and a zoom key 204 are provided on the upper surface of the handle 202. The trigger key 203 can be operated to control the start and end of shooting. The zoom key 204 can be operated to change the zooming magnification of the photographic lens (photographic optical system) 101.

A cover member 802 is provided on the left side surface of the audio unit 205. The cover member 802 is pivotally attached to the audio unit 205. By pivoting the cover member 802, the state of covering the audio recording operation unit (switch groups 801a and 801b) can be switched between a closed state and an open state. More specifically, in the closed state, the switch groups 801a and 801b are covered with the cover member 802. On the other hand, in the open state, the switch groups 801a and 801b are exposed.

In addition, dial members 803a and 803b are provided on the upper surface of the audio unit 205. The dial members 803a and 803b can be operated to adjust the level of recording audio information. In executing recording by using the built-in microphones 103a and 103b, the recording level of the built-in microphone 103a can be adjusted by rotating the dial member 803a. By rotating the dial member 803b, the recording level of the built-in microphone 103b can be adjusted.

In executing recording by using the external microphone, the recording level of the external microphone connected to the video camera via the external connector 104a, can be adjusted. Similarly, by rotating the dial member 803b, the recording level of the external microphone connected via the external connector 104b can be adjusted.

Figure 2:
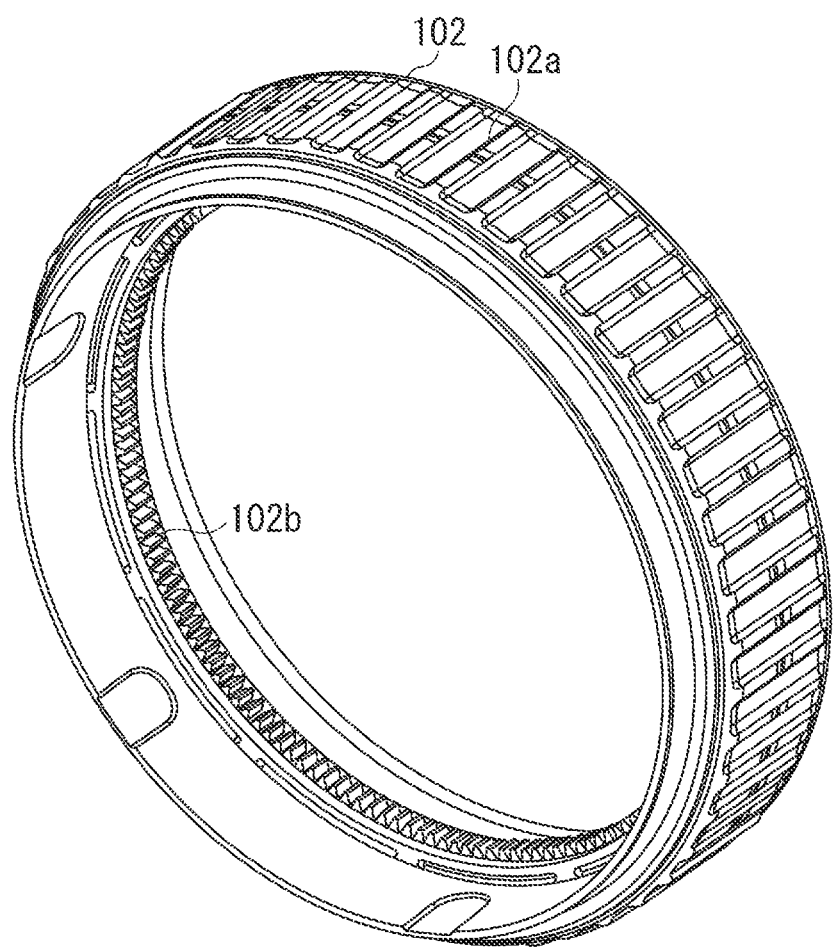
FIG. 2 illustrates an exemplary configuration of a rotating operation ring.

FIG. 2 illustrates an exemplary configuration of the rotating operation ring 102. An outer surface of the rotating operation ring 102 is constituted by an elastic member 102a, which is made of an elastic material, such as rubber. A gear 102b is provided on the inner circumference side of the rotating operation ring 102.

Because the outer surface (an operation surface) of the rotating operation ring 102, on which a user can operate the rotating operation ring 102, is constituted by the elastic member 102a, which is made of an elastic material, such as rubber, the user can accurately operate the rotating operation ring 102 without accidental sliding of the user's finger on the operation surface.

The gear 102b, which is formed on the inner circumference side of the rotating operation ring 102, is connected with a pulse encoder, which is provided between the rotating operation ring 102 and the photographic lens 101. Accordingly, by rotating the rotating operation ring 102, the pulse encoder is rotated to output a signal.

The video camera according to the present exemplary embodiment can drive the photographic lens 101 to execute focusing according to the signal output from the pulse encoder. More specifically, by operating the rotating operation ring 102, the user can execute shooting with manual focusing.

In the video camera according to the present exemplary embodiment, the rotating operation ring 102 is provided on the outer periphery of the photographic lens 101. Accordingly, the present exemplary embodiment can implement a video camera having a high usability because the present exemplary embodiment can allow the user to execute focusing of the photographic lens 101 by intuition.

Figure 3:
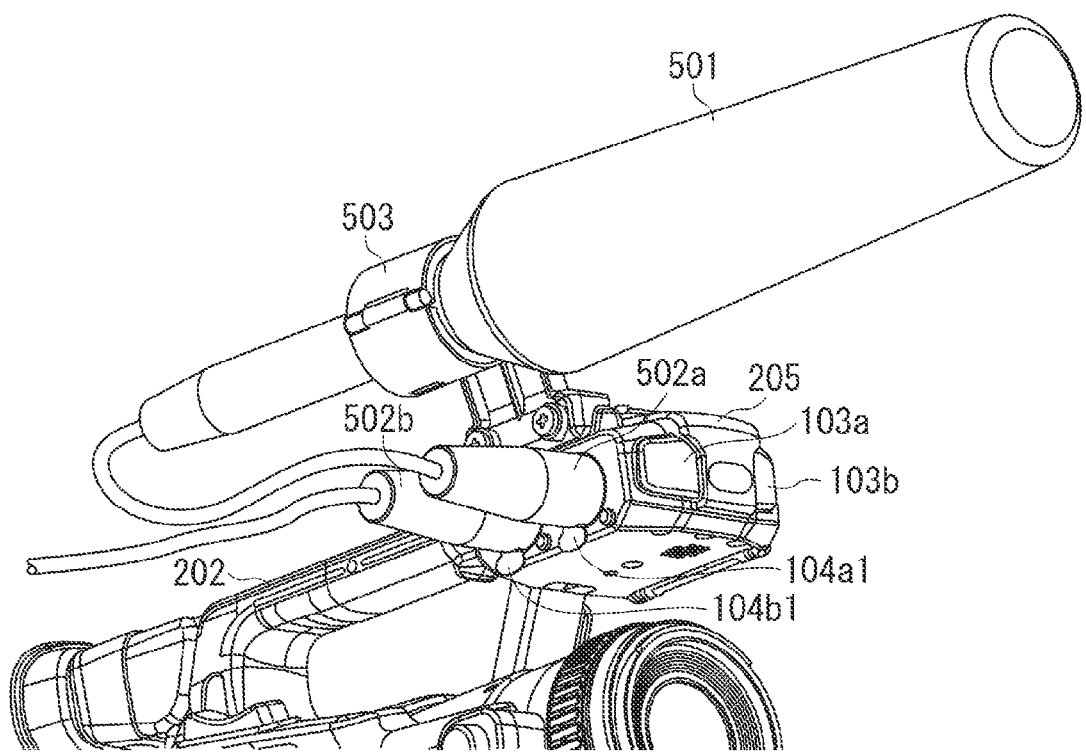
FIG. 3 illustrates a state in which an external microphone is attached to the video camera according to an exemplary embodiment of the present invention.

FIG. 3 illustrates a state in which an external microphone 501 is attached to the video camera according to the present exemplary embodiment. Referring to FIG. 3, the external microphone 501 is fixedly held by a microphone holder 503. A plug 502a is connected to the external connector 104a.

In recording audio information by using the external microphone 501, the recording level of the external microphone 501 can be adjusted by rotating the dial member 803a. When the plug 502a is inserted into the external connector 104a, an engagement claw of the external connector 104a, which is provided inside the external connector 104a, and a recessed portion inside the plug 502a engage each other. With the above-described configuration, the plug 502a can be prevented from easily disengaging from the external connector 104a during the transportation of the video camera or during shooting.

The engagement between the plug 502a and the external connector 104a can be released by pressing a connection release knob 104a1, which is provided to the external connector 104a at a lower edge portion of the external connector 104a, leftwards in FIG. 1A. By pressing the connection release knob 104a1 in this manner, the engagement between the plug 502a and the external connector 104a is released. After the engagement between the plug 502a and the external connector 104a is released, the plug 502a can be pulled out of the external connector 104a.

In the example illustrated in FIG. 3, another external microphone (not illustrated) includes a plug 502b, which is connected with the external connector 104b.

In the video camera according to the present exemplary embodiment, connection release knobs 104a1 and 104b1 are provided below the external connectors 104a and 104b, respectively. If the connection release knobs 104a1 and 104b1 are provided above the external connectors 104a and 104b, the microphone holder 503 may become an obstacle against a user operation on the connection release knob. As a result, in this case, the user cannot easily operate the connection release knob.

On the other hand, in the present exemplary embodiment, the connection release knobs 104a1 and 104b1 are provided below the external connectors 104a and 104b. Accordingly, the microphone holder 503 may not become an obstacle against a user operation on the connection release knobs 104a1 and 104b1.

Figure 4:
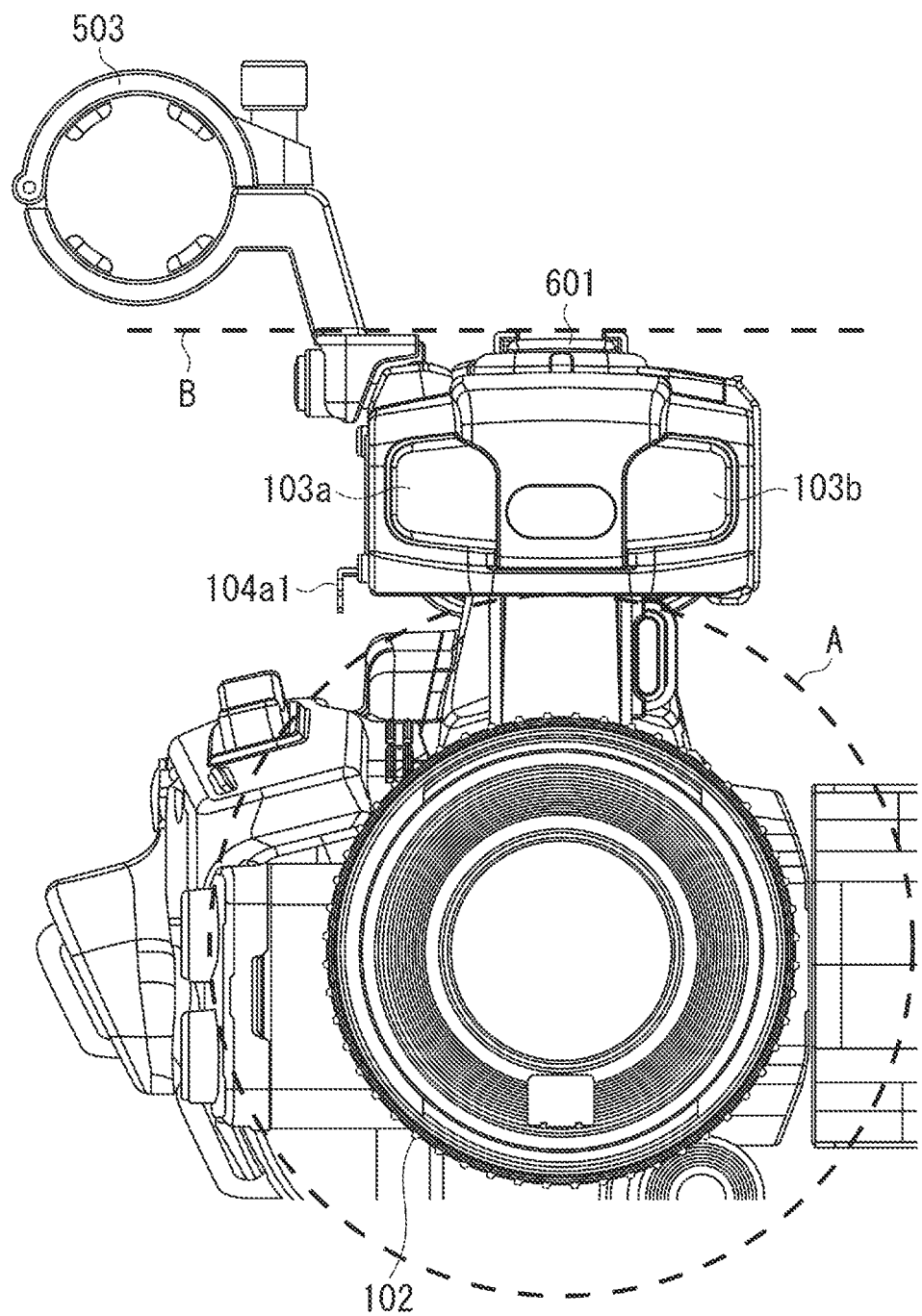
FIG. 4 is a front view of the video camera according to an exemplary embodiment of the present invention.

FIG. 4 is a front view of the video camera according to the present exemplary embodiment. Referring to FIG. 4, a virtual circle A is virtually drawn around an optical axis of the photographic lens 101. More specifically, the virtual circle A indicates an assumed range in which the hand of a photographer may be positioned when the operator operates the rotating operation ring 102.

The connection release knob 104a1 is provided to protrude from the side surface of the audio unit 205 in the downward direction, but is provided to stay outside the range indicated with the virtual circle A. Accordingly, during an operation by the photographer on the rotating operation ring 102, the finger of the photographer may not contact the connection release knob 104a1.

In the example illustrated in FIG. 4, a surface B indicates a surface on which the microphone holder 503 is attached to the video camera. The position (the vertical position) of an upper surface of the accessory shoe 601 is set at a position as high as or slightly higher than the height of the surface B, on which the microphone holder 503 is attached.

Figure 5:
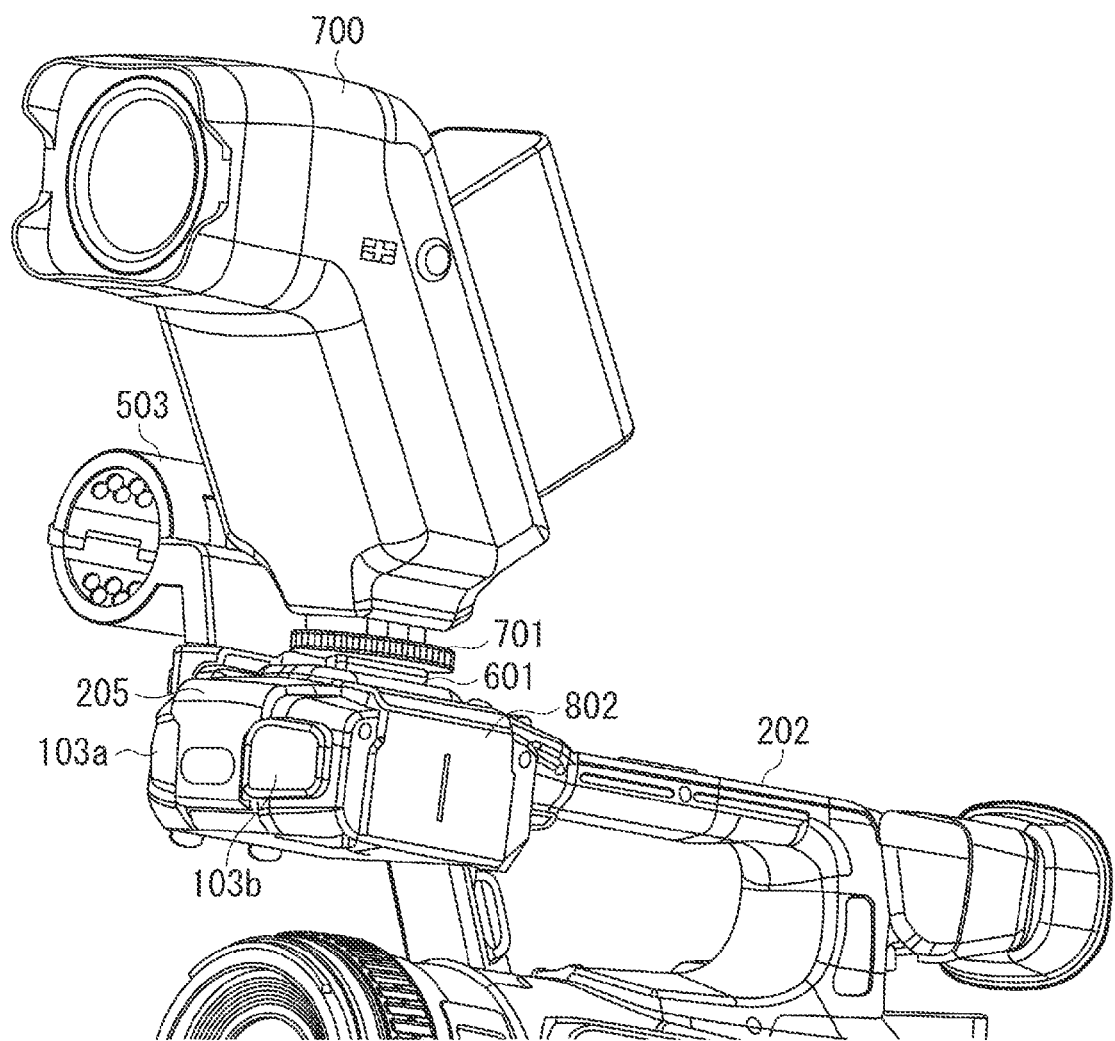
FIG. 5 illustrates a state in which a video light is attached to an accessory shoe.

FIG. 5 illustrates a state in which a video light 700 is attached to the accessory shoe 601. As described above, in the present exemplary embodiment, the position (the vertical position) of an upper surface of the accessory shoe 601 is set at a position as high as or slightly higher than the height of the surface B, on which the microphone holder 503 is attached. Accordingly, the position of the accessory attaching ring 701 is higher than the vertical position of the surface B, on which the microphone holder 503 is attached. With the above-described configuration, the attaching portion of the microphone holder 503 may not become an obstacle against a user operation for rotating the accessory attaching ring 701.

Figure 6:
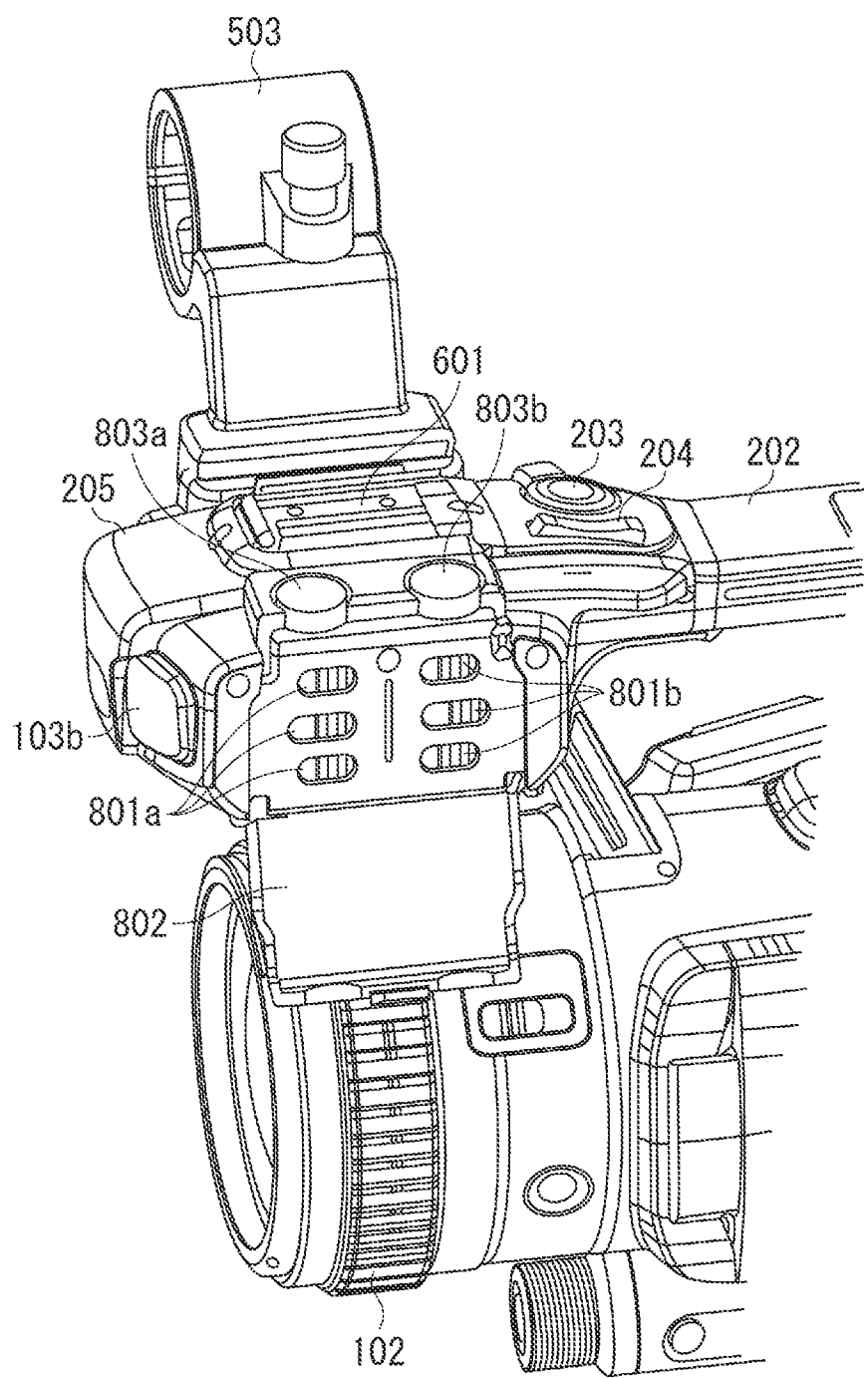
FIG. 6 illustrates a state in which a cover member, which is provided on a left side surface of an audio unit, pivots to open.

FIG. 6 illustrates a state in which the cover member 802, which is provided on the left side surface of the audio unit 205, pivots to open.

Referring to FIG. 6, an operation member, which is a member for recording audio information, is provided on the left side surface of the audio unit 205, which is a surface that faces the surface on which the external connectors 104a and 104b are provided when the cover member 802 is in the open state. More specifically, in the open state of the cover member 802 (i.e., when the cover member 802 is opened), the user can switch between an input from the external microphone and an input from the built-in microphones 103a and 103b, switch whether to apply a voltage to the external microphone, and switch between an automatic mode and a manual mode for adjusting the recording level.

By operating the switch group 801a, the user can execute the above-described settings to the external microphone, which is connected with the built-in microphone 103a or the external connector 104a. Similarly, by operating the switch group 801b, the user can execute the above-described settings to the external microphone connected to the built-in microphone 103b or the external connector 104b.

The switch group 801a is provided at a position opposite the attaching position of the external connector 104a. The switch group 801b is provided at a position opposite the attaching position of the external connector 104b.

More specifically, the external connectors 104a and 104b are provided in tandem in the longitudinal direction of the video camera, and the switch groups 801a and 801b are also provided in tandem in the longitudinal direction of the video camera, corresponding to the direction of arrangement of the external connectors 104a and 104b. Similarly, the dial members 803a and 803b are also provided in tandem in the longitudinal direction of the video camera, corresponding to the direction of arrangement of the external connectors 104a and 104b.

With the above-described configuration, the present exemplary embodiment can allow the user to intuitively recognize the positions of the external connectors, the corresponding switch groups, and the dial members.

When the cover member 802 is in the closed state as illustrated in FIGS. 1B and 1C, the switch groups 801a and 801b are completely covered with the cover member 802. In this state, the user cannot operate the switch groups 801a and 801b. On the other hand, when the cover member 802 is in the open state, the side surfaces of the dial members 803a and 803b are exposed. Furthermore, when the cover member 802 is in the closed state, the cover member 802 covers the side surfaces of the dial members 803a and 803b. Because the upper surfaces of the dial members 803a and 803b are exposed even when the cover member 802 has covered the side surfaces of the dial members 803a and 803b, the user can visually recognize scales provided on the dial members 803a and 803b.

As described above, the dial members 803a and 803b are provided on the upper surface of the audio unit 205. In addition, the height (vertical position) of the dial members 803a and 803b are set to be lower than the height of the upper surface of the audio unit 205. Accordingly, the side surfaces of the dial members 803a and 803b are covered with the audio unit 205 and the cover member 802.

More specifically, approximately 250° of each of the side surfaces of the dial members 803a and 803b is covered by the audio unit 205, and the remaining 110° thereof is covered with the cover member 802.

Figure 7:
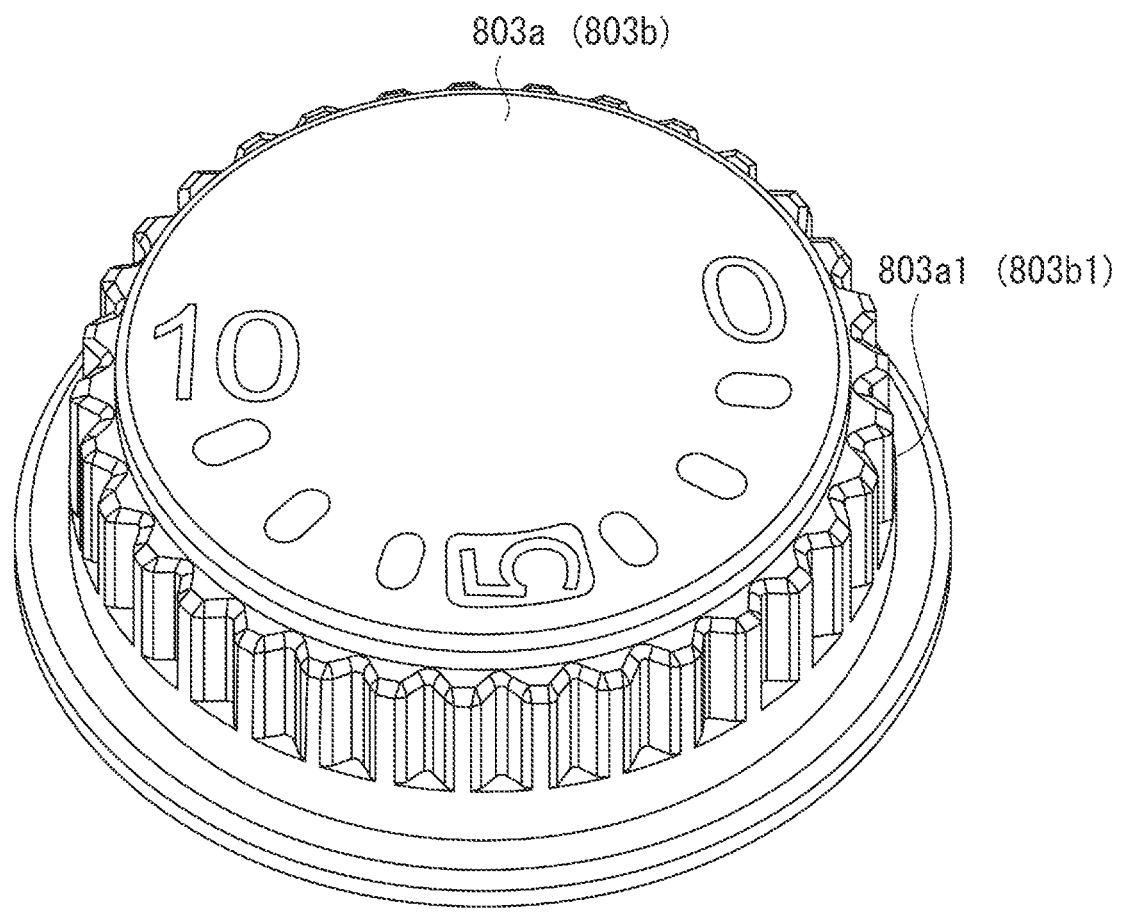
FIG. 7 illustrates an appearance of a dial member.

FIG. 7 illustrates an appearance of the dial member 803a. The dial member 803b has the same shape as the shape of the dial member 803a.

The dial member 803a has level scales provided and displayed on the upper surface thereof. However, no operation knob is formed. On a side surface 803a1 of the dial member 803a, a knurled shape, which includes projections and depressions, is formed.

Accordingly, when the cover member 802 is in the closed state, cover portions 802e and 802f of the cover member 802 cover the side surfaces of the dial member 803a and 803b. In this state, the user cannot rotate the dial members 803a and 803b. In order to rotate the dial members 803a and 803b, it is necessary to expose the side surfaces of the dial members 803a and 803b by opening the cover member 802.

Because the upper surfaces of the dial members 803a and 803b remain exposed even when the cover member 802 is in the closed state, the user can visually recognize a setting value of the recording level regardless of whether the cover member 802 is in the open state.

The cover portions 802e and 802f of the cover member 802 are provided on the edge of the cover member 802 and extend from the cover member 802. Accordingly, the cover portions 802e and 802f function as a hook for opening the cover member 802 with the user's finger.

Alternatively, the cover portions 802e and 802f of the cover member 802 can have a gear-like shape for engaging with the dial members 803a and 803b at the knurled shape thereof, which is formed inside the dial members 803a and 803b. With the above-described configuration, when the cover member 802 is in the closed state, the side surfaces of the dial members 803a and 803b engage the cover portions 802e and 802f, respectively. In this state, the user can lock the dial members 803a and 803b to prevent the dial members 803a and 803b from rotating.

The cover member 802 does not cover the upper surfaces of the dial members 803a and 803b, but covers only the side surfaces of the dial members 803a and 803b. With the above-described configuration, the size of the audio unit 205 in the direction of the height (i.e., in the vertical direction) can be effectively reduced by a size equivalent to the thickness of the cover member 802.

In addition, because the cover member 802 does not cover the upper surfaces of the dial member 803a and 803b, the video light 700 may not become an obstacle against the opening or closing of the cover member 802 even when the video light 700 is attached to the accessory shoe 601.

Figure 8:
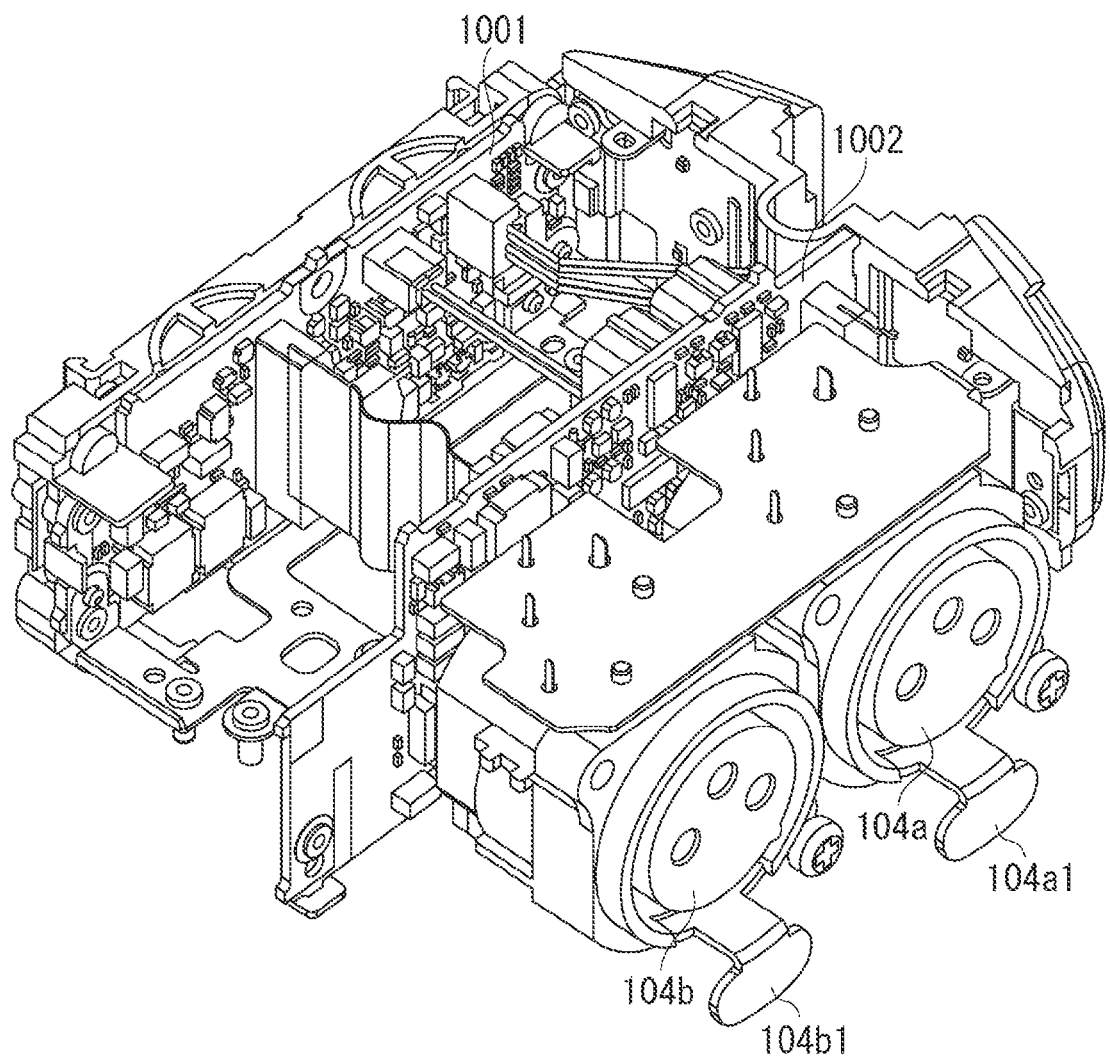
FIG. 8 is a perspective view illustrating an exemplary inner configuration of the audio unit.
Figure 9:
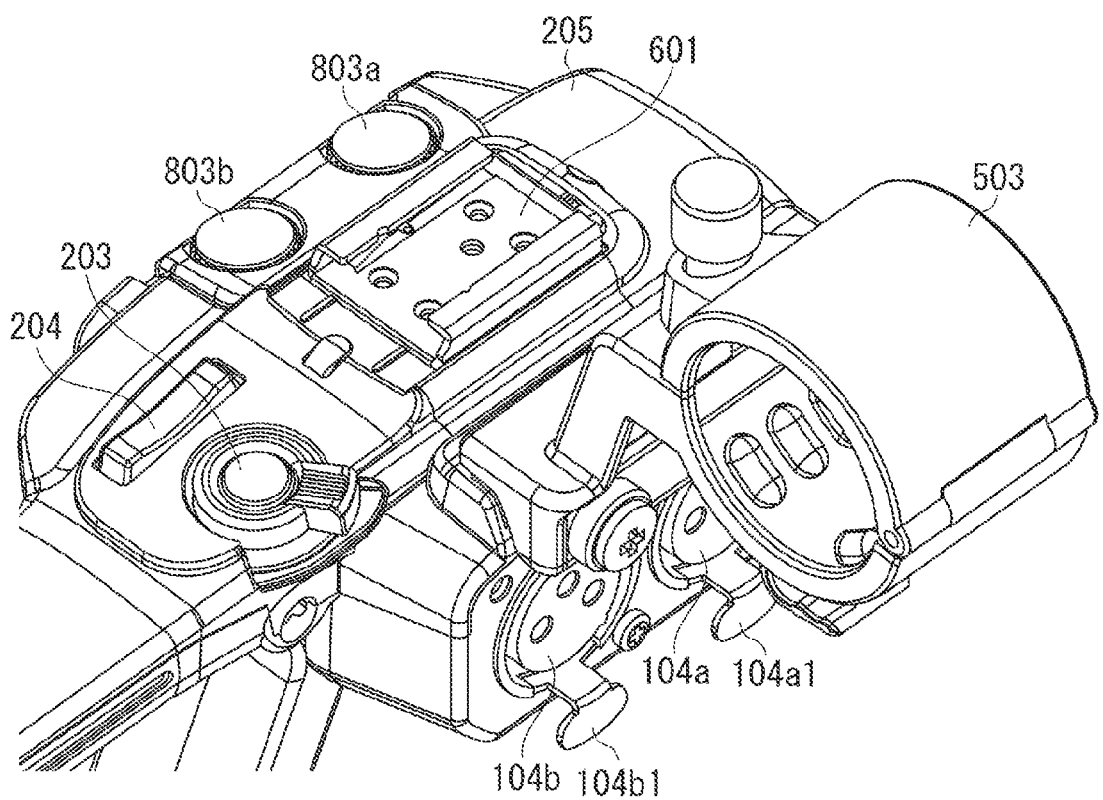
FIG. 9 is a perspective view illustrating an appearance of the audio unit.

FIG. 8 is a perspective view illustrating an exemplary inner configuration of the audio unit 205. FIG. 9 is a perspective view illustrating an appearance of the audio unit 205.

Referring to FIG. 8, substrates (circuit boards) 1001 and 1002 are provided inside the audio unit 205. An audio signal processing circuit configured to process an audio signal output from the built-in microphones 103a and 103b and the external microphone 501 is mounted on the substrates 1001 and 1002.

In the present exemplary embodiment, components related to audio information are collectively provided on the front edge of the handle 202, on which the built-in microphones 103a and 103b are provided. Accordingly, the present exemplary embodiment executes processing related to audio information on the substrates 1001 and 1002, which are provided to the audio unit 205. With the above-described configuration, the present exemplary embodiment can implement a high performance video camera configured to execute various processing on an audio signal.

In addition, with the above-described configuration, the length of wirings for transmitting a weak audio signal that has not been amplified yet can be shortened. Accordingly, the present exemplary embodiment can implement a high performance video camera that is highly tolerant of noises.

Figure 10:
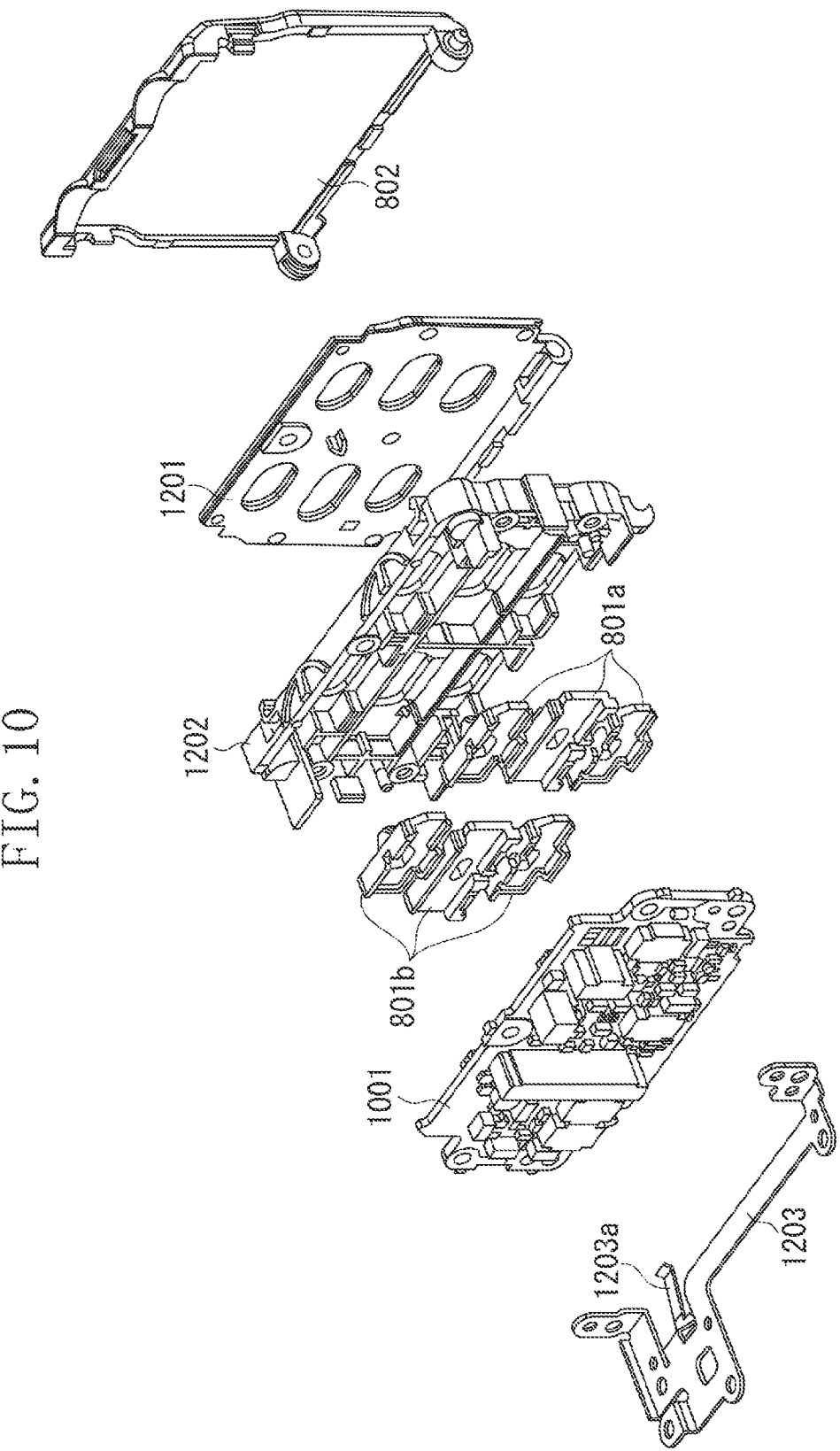
FIG. 10 is an exploded perspective view illustrating an attaching structure of the cover member.

An exemplary configuration of the cover member 802 will be described in detail below. FIG. 10 is an exploded perspective view illustrating an exemplary attaching structure of the cover member 802.

The cover member 802 is molded by a transparent or translucent molding member in order to allow the user to view the state of various switches even when the cover member 802 is in the closed state. The cover member 802 can be opened and closed and can be easily detached.

Referring to FIG. 10, on the surface of the audio unit 205 on which the cover member 802 is provided, the cover member 802 (in the closed state), an exterior member 1201, a sliding switch holding unit 1202, and the switch groups 801a and 801b are provided in a mutually overlapped state in this order from the outer surface of the video camera.

The sliding switch holding unit 1202 has a box-like shape to constitute the side surfaces of the audio unit 205. The switch groups 801a and 801b are inserted into the sliding switch holding unit 1202.

The substrate 1001, on which switch devices configured to operate according to an operation of the switch groups 801a and 801b in interlock thereto are implemented, covers the back side of the sliding switch holding unit 1202. A sheet metal member 1203 is attached to the sliding switch holding unit 1202.

The sheet metal member 1203 is fixed to the base member of the audio unit 205. Accordingly, the sliding switch holding unit 1202 is integrated with the base member of the audio unit 205 via the sheet metal member 1203.

Accordingly, a portion that includes the sliding switch holding unit 1202 and the base member of the audio unit 205 integrated together functions as a base member according to the present exemplary embodiment. More specifically, the sliding switch holding unit 1202 functions as a first base member according to the present exemplary embodiment. The base member of the audio unit 205 functions as a second base member according to the present exemplary embodiment.

A plate spring portion 1203a is formed on the sheet metal member 1203. When the cover member 802 is opened or closed, the plate spring portion 1203a generates a frictional force against the cover member 802.

Figure 11:
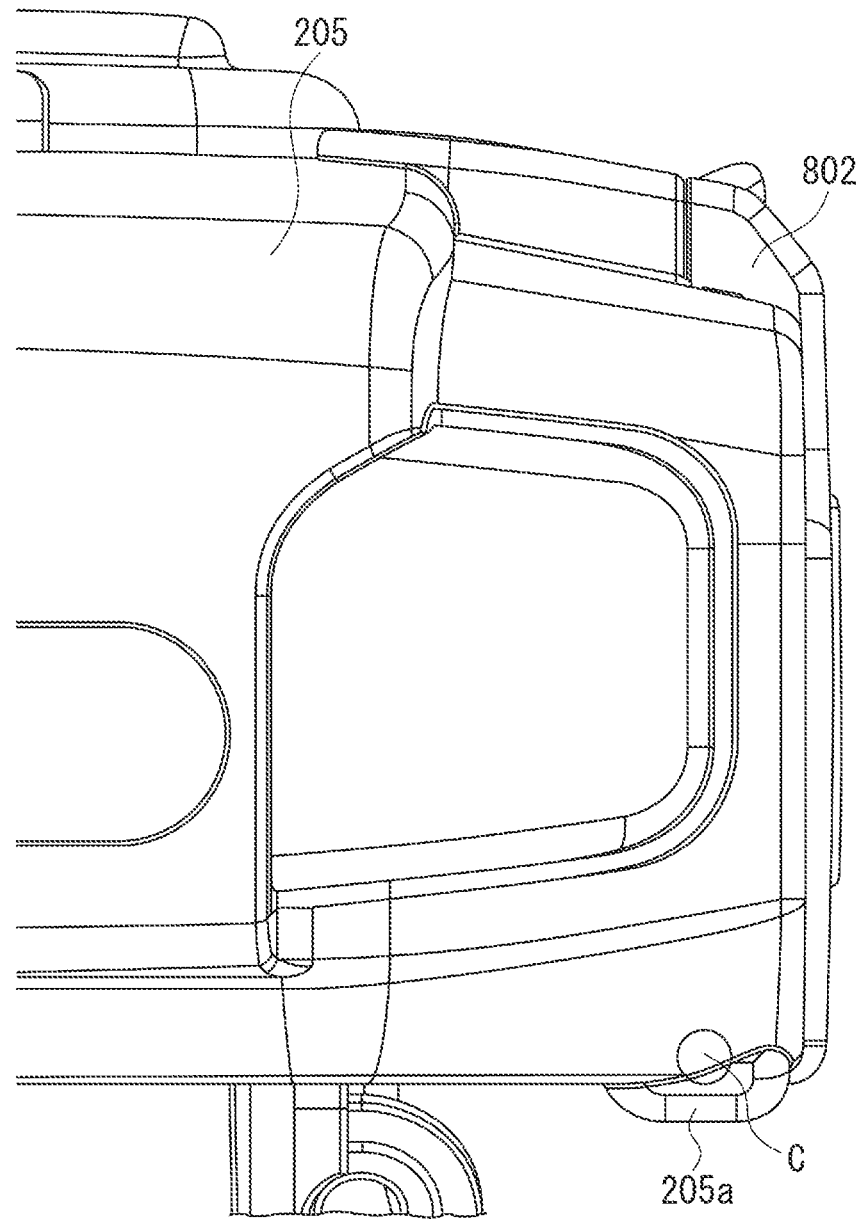
FIG. 11 illustrates a pivoting axis of the cover member.

The cover member 802 can pivot around a shaft hole C (FIG. 11). More specifically, the shaft hole C is formed in a lower portion of the audio unit 205 (FIG. 11) at a position closer to the inside than the side surface of the audio unit 205.

The shaft hole C is positioned at an appropriate position for preventing a bulge-shaped portion 205a, which is a member configured to form the shaft hole C, from protruding from the side surface of the audio unit 205. The same applies to a bulge-shaped portion 205b. The bulge-shaped portion 205b will be described in detail below.

Figure 12A:
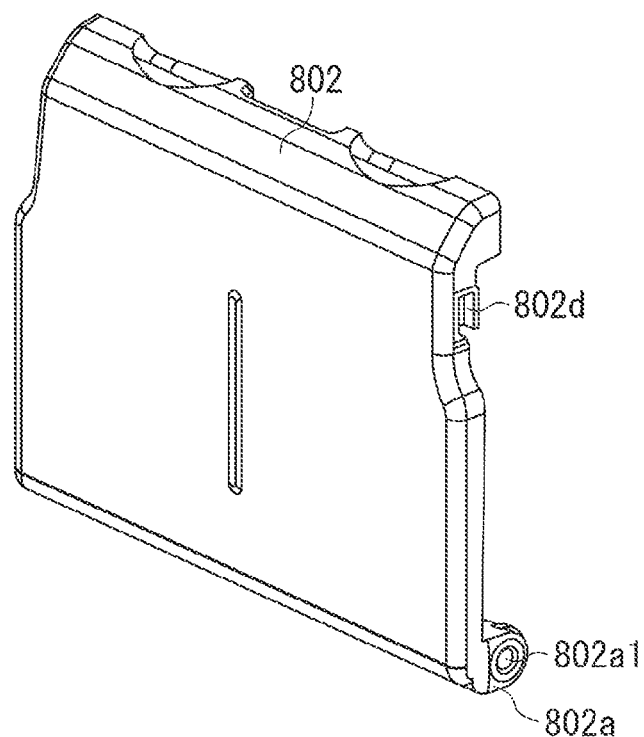
FIGS. 12A and 12B illustrate an exemplary shape of the cover member.
Figure 12B:
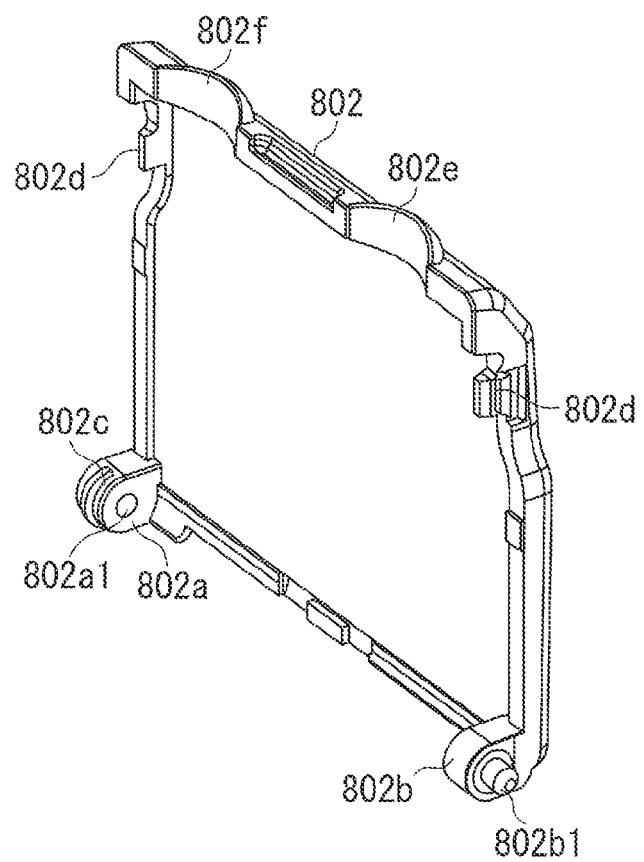
Figure 13:
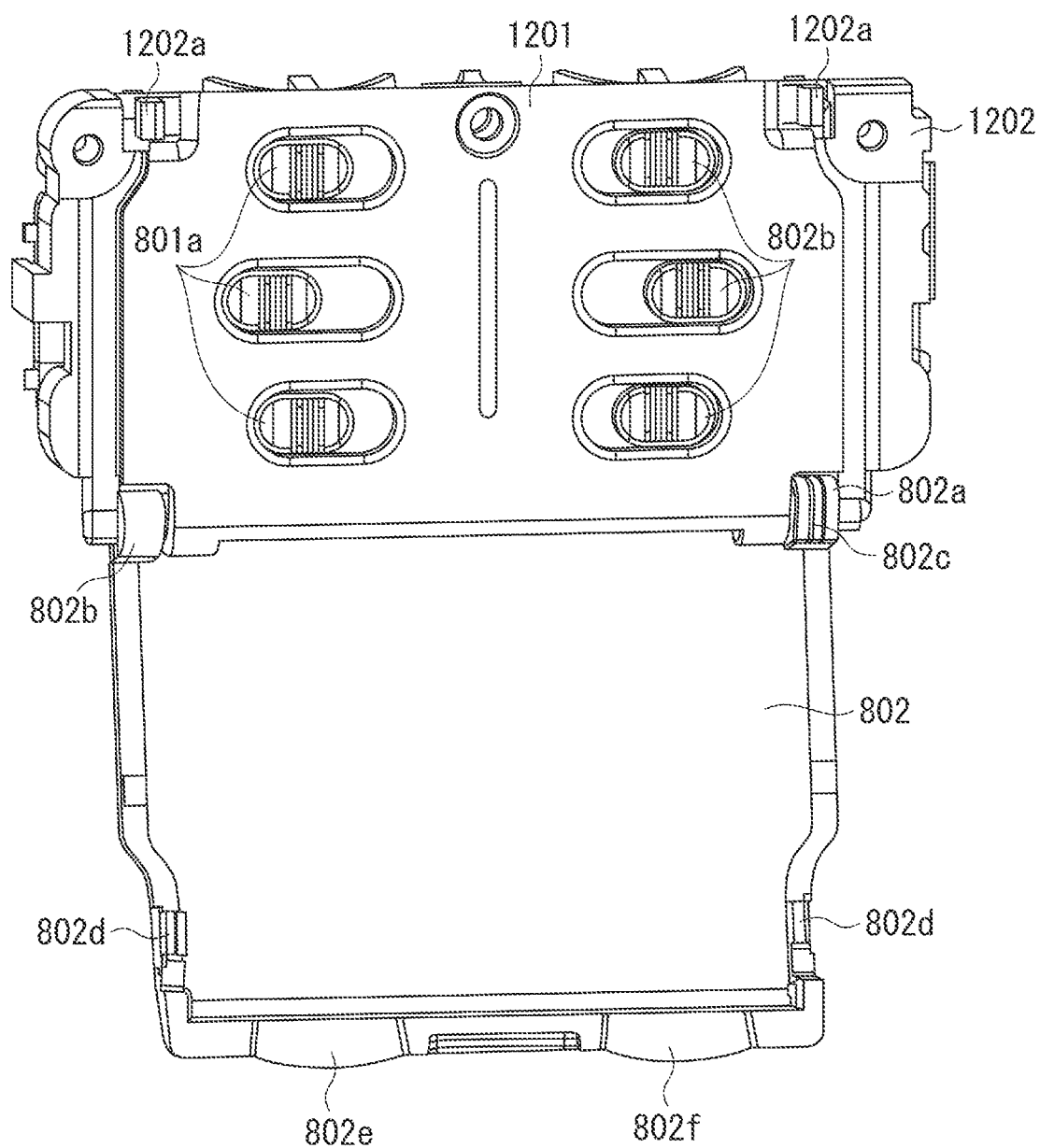
FIG. 13 is a perspective view illustrating a state in which the cover member is attached.

FIGS. 12A and 12B illustrate an exemplary shape of the cover member 802. More specifically, FIG. 12A is a perspective view of the cover member 802 as viewed from the front surface. FIG. 12B is a perspective view of the cover member 802 as viewed from the back surface. FIG. 13 is a perspective view illustrating a state in which the cover member 802 is attached.

Referring to FIG. 12B, hinges 802a and 802b are formed on the cover member 802 on both edges thereof on the side of the pivot. A through hole 802a1 is formed on the hinge 802a. In addition, a cam 802c, which the plate spring portion 1203a contacts, is formed on the hinge 802a.

On the other hand, a shaft 802b1 is integrally formed on the hinge 802b. As illustrated in FIG. 12B, the cover portions 802e and 802f, which cover the side surfaces of the dial members 803a and 803b when the cover member 802 is in the closed state, are formed on the edge of the cover member 802.

An engagement claw 802d is formed on each of two edges of the cover member 802 between the edge on which the hinges 802a and 802b are formed and the other edge on which the cover portions 802e and 802f are formed. When the cover member 802 is in the closed state, the engagement claw 802d engages an engagement claw 1202a, which is formed on the sliding switch holding unit 1202 as illustrated in FIG. 13. In this state, the engagement claw 802d functions to maintain the closed state of the cover member 802.

The cam 802c of the cover member 802 is charged by the plate spring portion 1203a. Accordingly, looseness, which may otherwise occur when the cover member 802 is opened or closed, can be prevented.

Figure 14A:
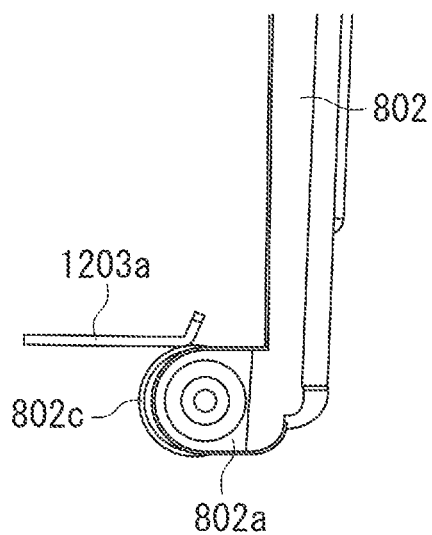
FIGS. 14A through 14D illustrate an exemplary relationship between a plate spring and a cam portion.
Figure 14B:
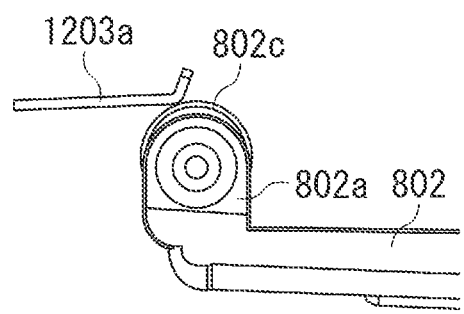
Figure 14C:
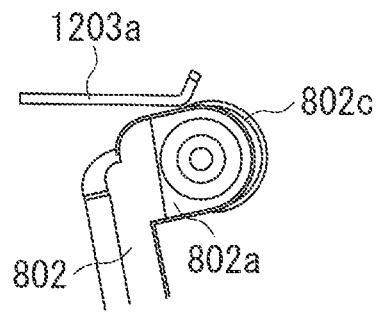
Figure 14D:
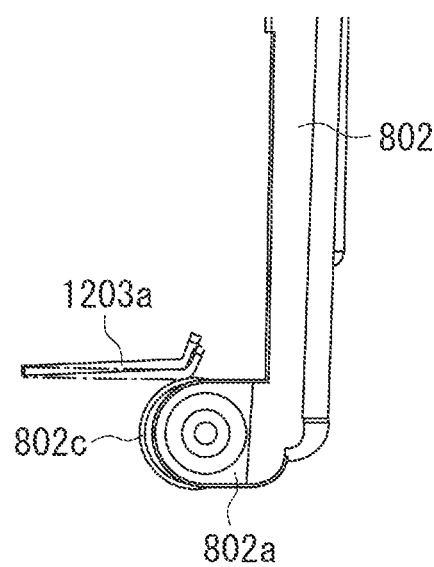

FIGS. 14A through 14D illustrate an exemplary relationship between the plate spring portion 1203a and the cam 802c. More specifically, FIG. 14A illustrates an exemplary relationship between the plate spring portion 1203a and the cam 802c when the cover member 802 is in the closed state. FIG. 14B illustrates an exemplary relationship between the plate spring portion 1203a and the cam 802c when the cover member 802 is in the open state at the angle of 90°. FIG. 14C illustrates an exemplary relationship between the sheet metal member 1203 and the cam 802c when the cover member 802 is in the open state. FIG. 14D illustrates a state of the plate spring portion 1203a when the cover member 802 is in the closed state and a state of the plate spring portion 1203a when the cover member 802 is in the open state by then angle of 90°, which are illustrated in a mutually overlapped manner.

Referring to FIG. 14D, the plate spring portion 1203a has a shape offset from the rotation shaft of the cover member 802 to control the amount of charge by the plate spring portion 1203a to become largest during the process of the opening or closing operation compared with the amount of charge in the closed state and the open state. More specifically, at the start of the opening operation, the cover member 802 is pressed in the direction of closing. On the other hand, around an intermediate state before being completely opened, the cover member 802 is pressed in the direction of opening.

With the above-described configuration, when the cover member 802 is opened or closed, the cover member 802 may not stop halfway in an intermediate state. Accordingly, the present exemplary embodiment can prevent the cover member 802 from being subjected to an unexpected load.

Figure 15:
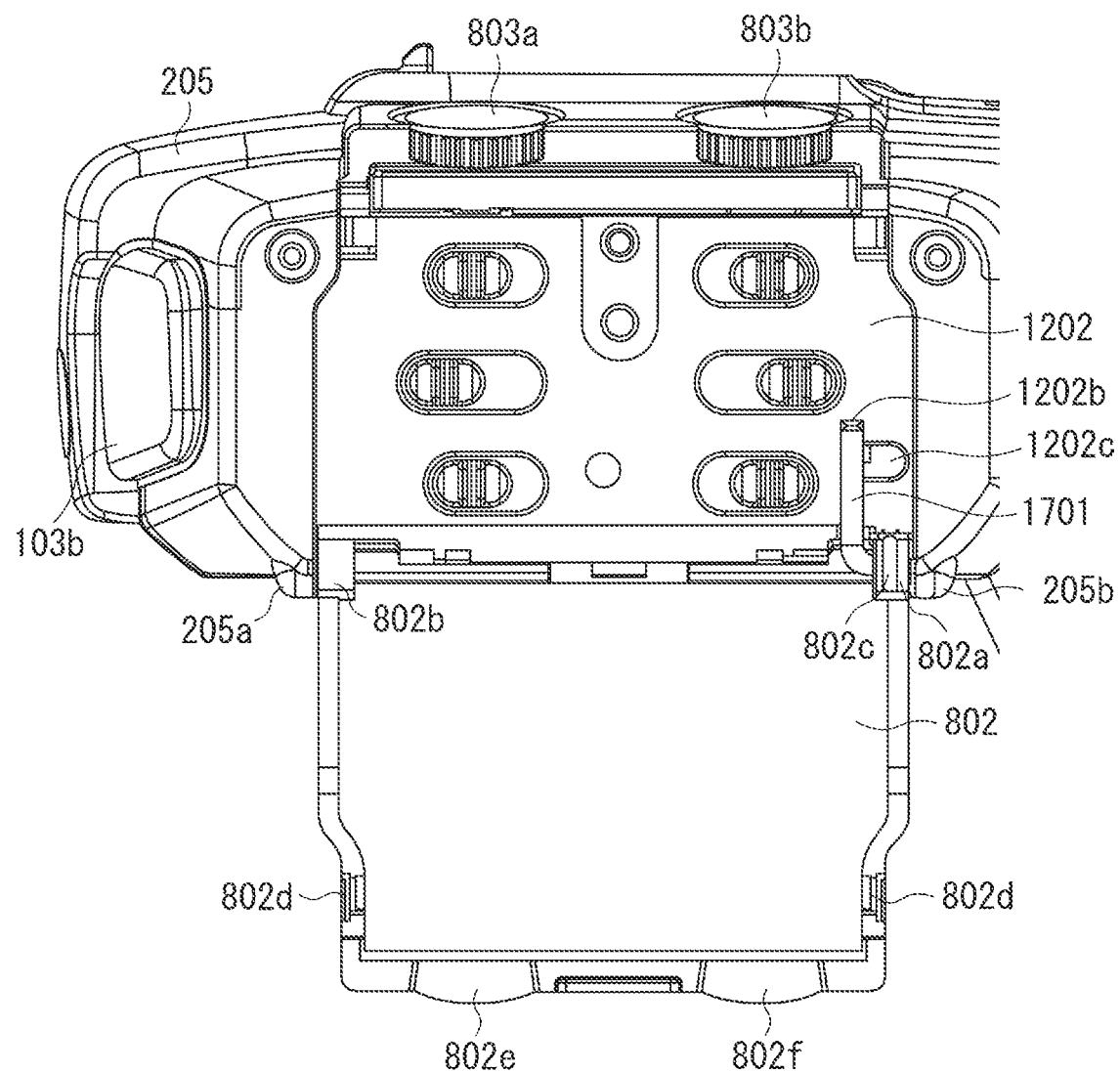
FIG. 15 is a side view illustrating a state in which an exterior member has been removed.

FIG. 15 is a side view illustrating a state in which the exterior member 1201 has been removed. Referring to FIG. 15, a shaft 1701, which is a shaft member constituted by a metal shaft, is inserted into the through hole 802a1 formed on the hinge 802a of the cover member 802.

A shaft hole into which a shaft 1701 is inserted is formed inside the bulge-shaped portion 205b provided below the audio unit 205. The shaft 1701 is inserted into the shaft hole of the bulge-shaped portion 205b after coming through the through hole 802a1. Accordingly, the hinge 802a of the cover member 802 is pivotably attached to the base member of the audio unit 205.

On the other hand, the shaft 802b1, which is formed on the hinge 802b of the cover member 802, is inserted into the shaft hole C (FIG. 11), which is formed inside the bulge-shaped portion 205a of the audio unit 205. Accordingly, the hinge 802b of the cover member 802 is pivotably attached to the base member of the audio unit 205.

Figure 16:
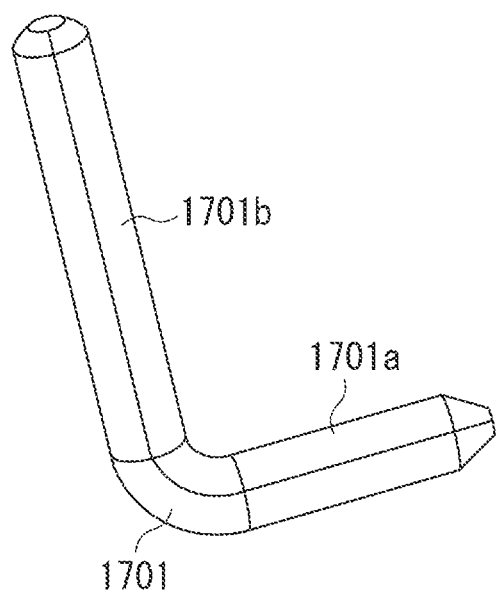
FIG. 16 is a perspective view illustrating an appearance of a shaft.

FIG. 16 is a perspective view illustrating an appearance of the shaft 1701. Referring to FIG. 16, the shaft 1701 has an L-like shape, which is shaped by a combination of a shaft portion 1701a and a fixed portion 1701b. The fixed portion 1701b is curved in the direction perpendicular to the shaft portion 1701a.

The shaft portion 1701a passes through the through hole 802a1 of the cover member 802 and is further inserted into the shaft hole of the bulge-shaped portion 205b. With the above-described configuration, the shaft portion 1701a functions as the rotation shaft of the cover member 802.

The fixed portion 1701b is recessed into and supported at a recessed portion 1202b, which is provided to the sliding switch holding unit 1202. Accordingly, the shaft 1701 is fixed by the sliding switch holding unit 1202. In addition, a groove 1202c, which is a portion provided to remove the shaft 1701, is provided adjacent to the recessed portion 1202b provided to fix the shaft 1701.

The exterior member 1201 is provided on the operation surface of the sliding switch holding unit 1202, i.e., the surface of the sliding switch holding unit 1202 that is exposed when the cover member 802 is in the open state.

Figure 17:
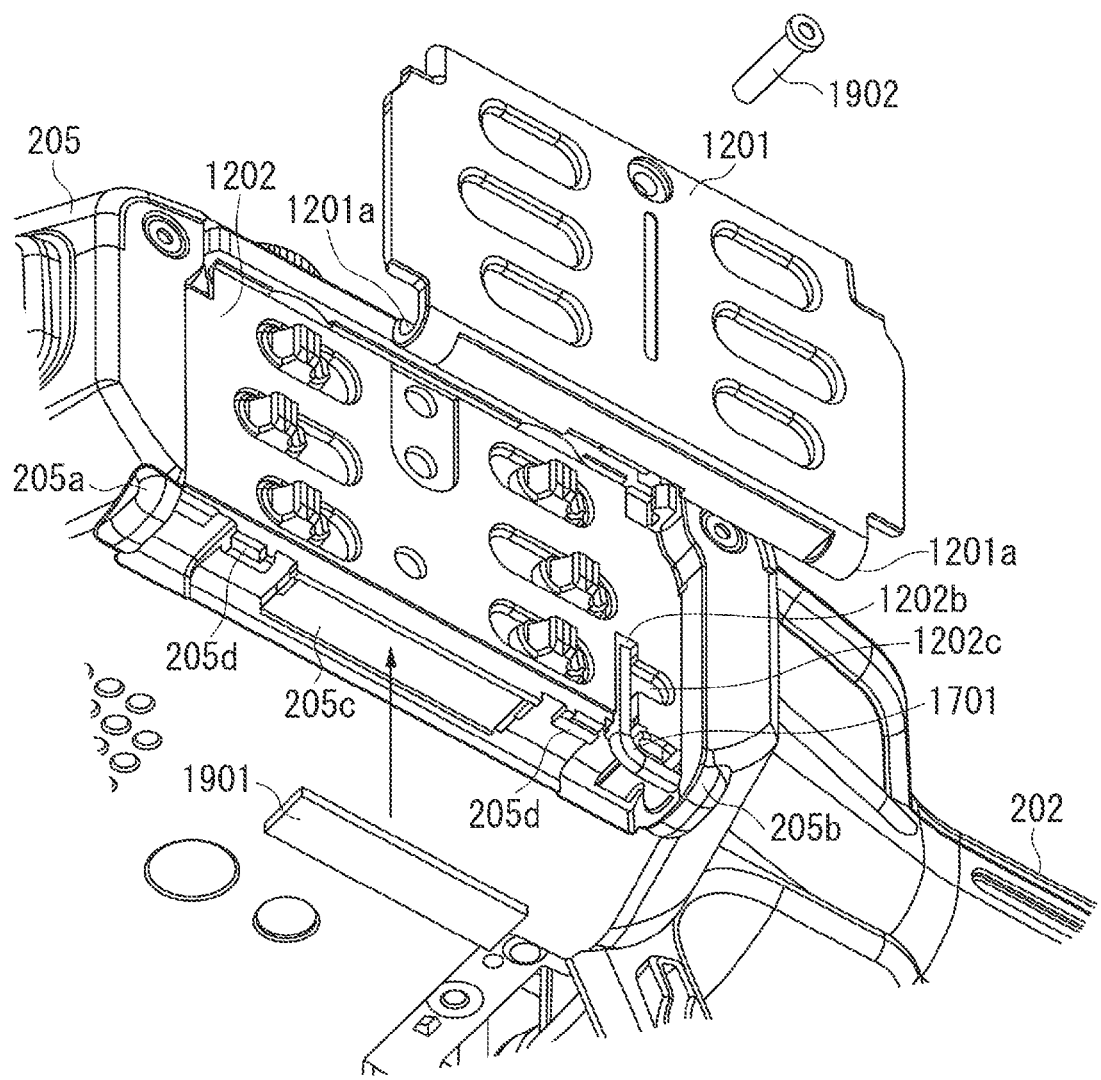
FIG. 17 is an exploded view illustrating an example of a structure for attaching the exterior member and a cushion member.

FIG. 17 an exploded view illustrating an example of a structure for attaching the exterior member 1201 and a cushion member 1901. For easier understanding, the cover member 802 is not illustrated in FIG. 17.

The exterior member 1201 is molded by using a conductive resin material. Referring to FIG. 17, the exterior member 1201 is hooked at a protruded shape 205d, which is provided on the lower portion of the audio unit 205, by a hook 1201a, which is formed on the lower portion of the exterior member 1201. Furthermore, the exterior member 1201 is fixed at a position in the upper portion thereof by using a screw 1902.

The screw 1902 is conductive. The exterior member 1201 is fixed to the sliding switch holding unit 1202 by using the screw 1902. In this manner, the screw 1902 is electrically connected with a ground line inside the audio unit 205. Accordingly, the exterior member 1201 is electrically connected with the ground line via the screw 1902.

The exterior member 1201, which is conductive, functions to shield the video camera from external electromagnetically-induced noises. In addition, the exterior member 1201 contacts the shaft 1701, which is recessed into the recessed portion 1202b. Accordingly, the shaft 1701 can be electrically connected with the ground line inside the audio unit 205.

The cushion 1901, which is a first elastic member, is provided on the lower surface of the audio unit 205. The cushion member 1901 is provisionally fixed to the lower surface of the audio unit 205 by using a double-face adhesive tape, and is then fixed between a part of a hook shape, which is formed on the lower portion of the exterior member 1201 and, and the lower surface of the audio unit 205.

More specifically, the cushion member 1901 is set to charge the exterior member 1201. With the above-described configuration, the present exemplary embodiment can restrict or prevent looseness of the exterior member 1201, which may otherwise occur because the exterior member 1201 is fixed by using the screw 1902 alone.

In addition, the cushion member 1901 is provided in a recessed portion 205c, which is formed on the lower surface of the audio unit 205. The outer shape of the cushion member 1901 is shaped so as not to protrude from the bottom surface of the audio unit 205 as illustrated in FIGS. 18A and 18B.

With the above-described configuration, the present exemplary embodiment can effectively prevent an unintentional touching of the cushion by the photographer. Accordingly, the present exemplary embodiment can prevent the cushion member 1901 from coming off and degrading the design of the video camera, which may occur if the cushion member 1901 is exposed.

An operation for opening the cover member 802 according to the present exemplary embodiment will be described in detail below with reference to FIGS. 18A, 18B, 19A, and 19B.

Figure 18A:
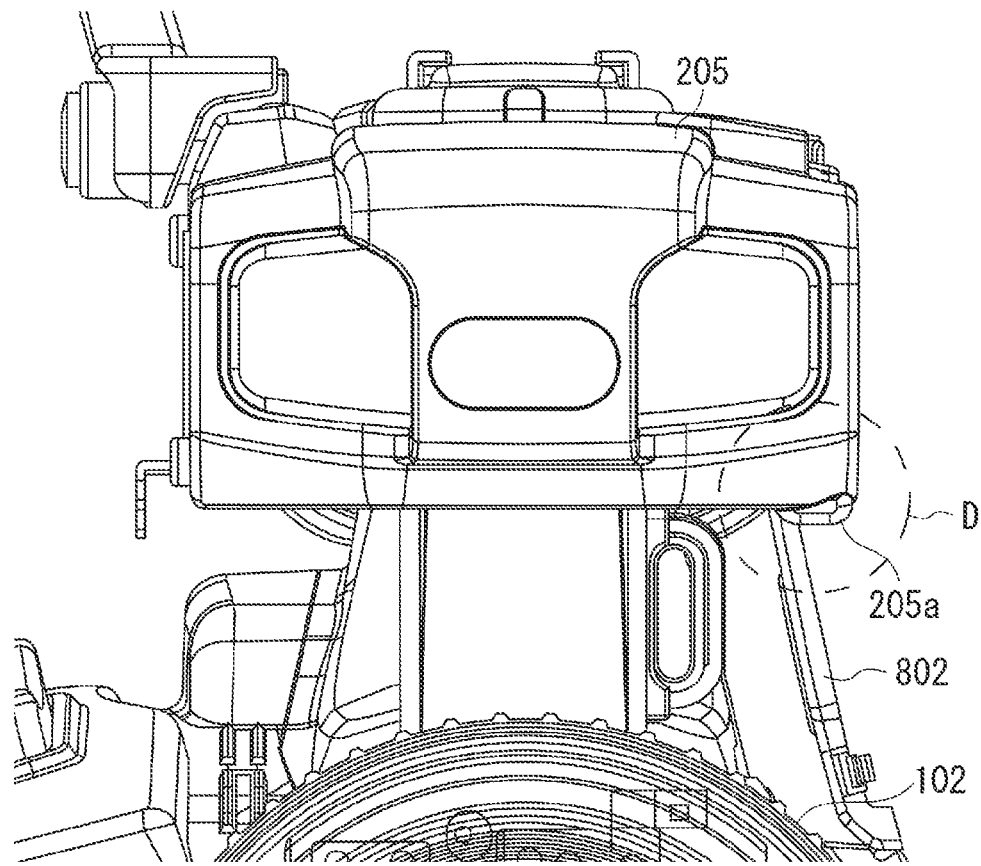
FIGS. 18A and 18B illustrate an exemplary opening operation of the cover member.
Figure 18B:
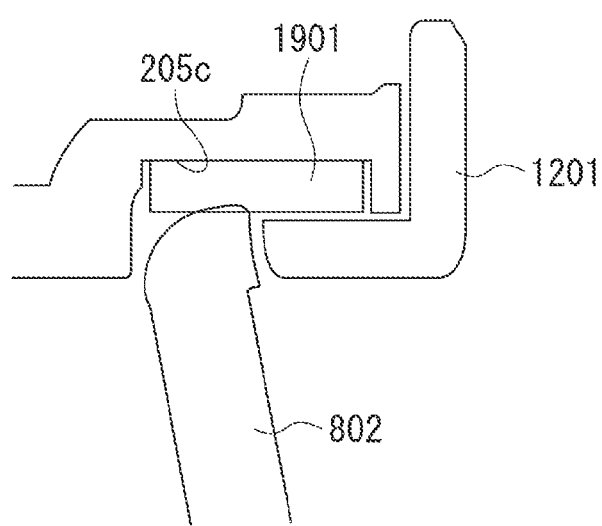
Figure 19A:
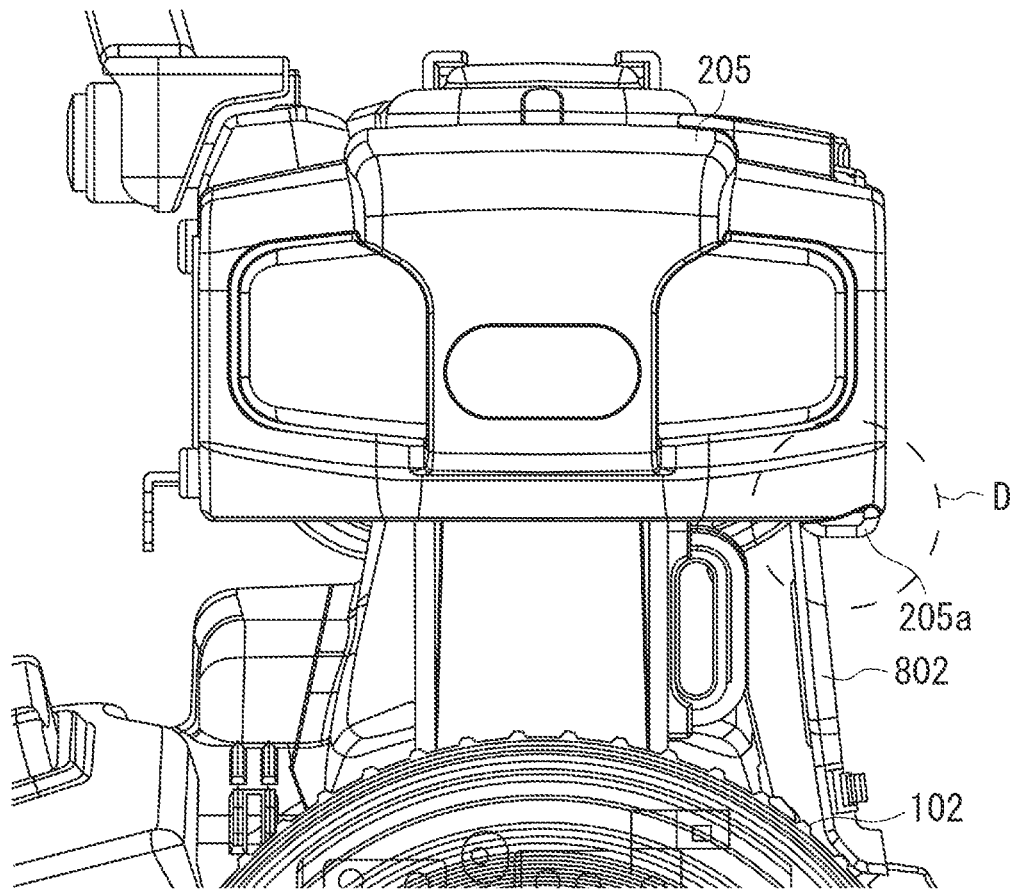
FIGS. 19A and 19B illustrate an exemplary opening operation of the cover member.
Figure 19B:
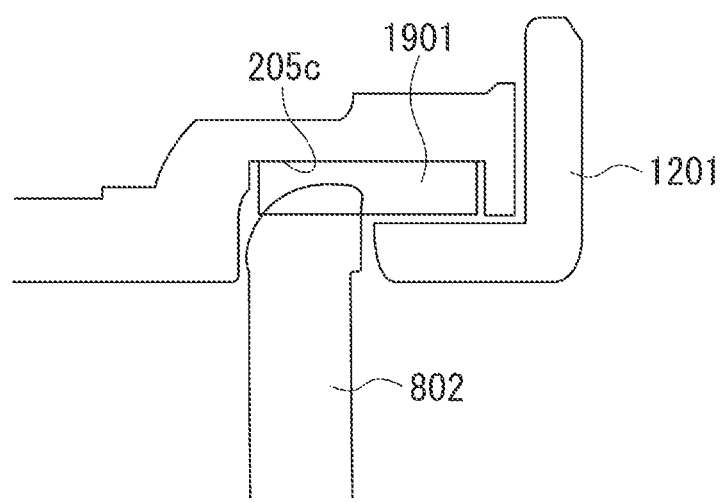

FIGS. 18A and 19A are front views of the video camera illustrating exemplary states of the cover member 802. FIGS. 18B and 19B illustrate cross sections of a portion D, which is illustrated in FIGS. 18A and 19A. The examples illustrated in FIGS. 18B and 19B particularly focus on the state of the cushion member 1901 and the position of the cover member 802.

When the cover member 802 pivots in the direction to open the cover member 802 from the closed state, one end of the cover member 802 closer to the pivoting axis of the cover member 802 contacts the cushion member 1901, which is attached to the audio unit 205 on the lower surface thereof, and stops there (the state illustrated in FIG. 18B).

In the state, the other end of the cover member 802, which is more distant from the pivoting axis of the cover member 802, does not contact the elastic member 102a, which is provided on the outer surface of the rotating operation ring 102, which is provided on the lower surface of the audio unit 205. With the above-described configuration, the cover member 802 may not become an obstacle in operating the rotating operation ring 102.

When a force in the opening direction is further applied to the cover member 802, which is in the open state as illustrated in FIG. 18A, one end of the cover member 802 causes the cushion member 1901 to elastically deform. Accordingly, the cover member 802 can be further opened.

As a result, as illustrated in FIG. 19A, the other end of the cover member 802 contacts the elastic member 102a, which is provided on the outer surface of the rotating operation ring 102. In this state, further pivoting of the cover member 802 is prevented. In other words, the elastic member 102a functions as a second elastic member according to the present exemplary embodiment.

With the above-described configuration, the present exemplary embodiment can effectively prevent the cover member 802 from being damaged or broken even if the cover member 802 in the open state is subjected to a further force in the opening direction.

In addition, in the present exemplary embodiment, the cover member 802 is stopped by the elastic member 102a, which can elastically deform as described above. With the above-described configuration, the present exemplary embodiment can effectively prevent the cover member 802, which is molded by a transparent or translucent member and whose scratch, if any, is conspicuous, from being scratched.

The video camera according to the present exemplary embodiment is configured to allow the cover member 802 to be relatively easily replaced if the cover member 802 is damaged or broken.

Figure 20A:
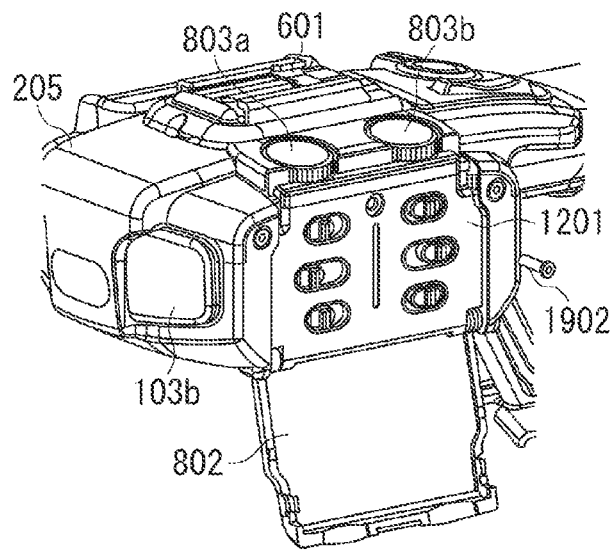
FIGS. 20A through 20C illustrate an exemplary operation for replacing the cover member.

FIGS. 20A through 20C and FIGS. 21A through 21C illustrate an exemplary operation for replacing the cover member 802. As illustrated in FIG. 20A, in removing the cover member 802, the cover member 802 is opened first. Then, the screw 1902, which fixes the exterior member 1201 to the sliding switch holding unit 1202, is dismounted.

Figure 20B:
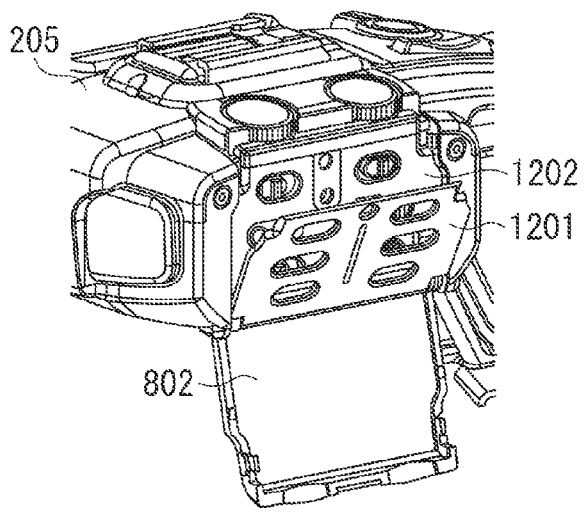

Subsequently, as illustrated in FIG. 20B, the exterior member 1201 pivots towards the sliding switch holding unit 1202 to release the engagement between the hook 1201a of the exterior member 1201 and the protruded shape 205d, which is provided on the lower surface of the audio unit 205.

Figure 20C:
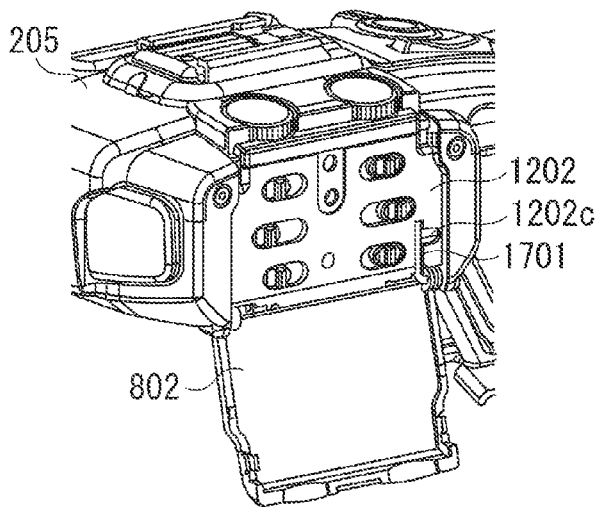

FIG. 20C illustrates a state after the exterior member 1201 is removed. In this state, the shaft 1701, which is recessed in the recessed portion 1202b, is exposed.

Figure 21A:
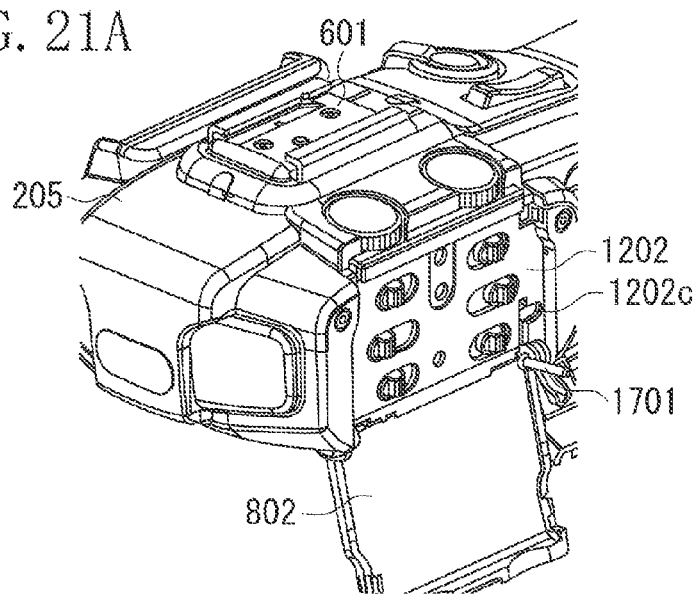
FIGS. 21A through 21C illustrate an exemplary operation for replacing the cover member.
Figure 21B:
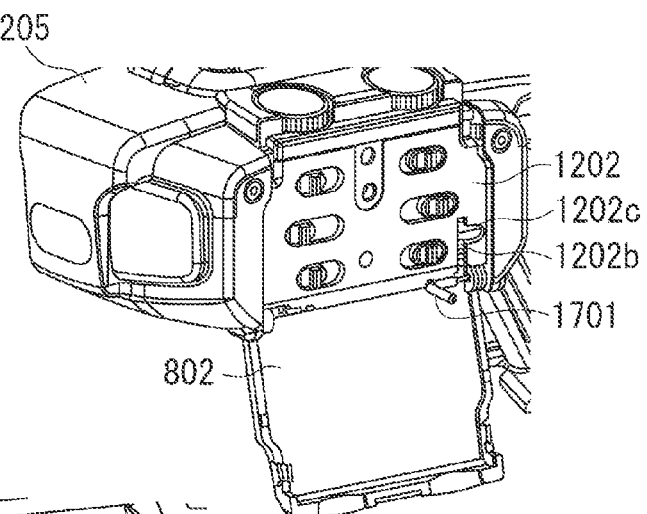

Then, with an appropriate tool inserted into the groove 1202c, which is a portion for removing the shaft 1701, the shaft 1701 is turned around the shaft portion 1701a thereof. Furthermore, the fixed portion 1701b of the shaft 1701 is taken out of the recessed portion 1202b as illustrated in FIG. 21A.

Figure 21C:
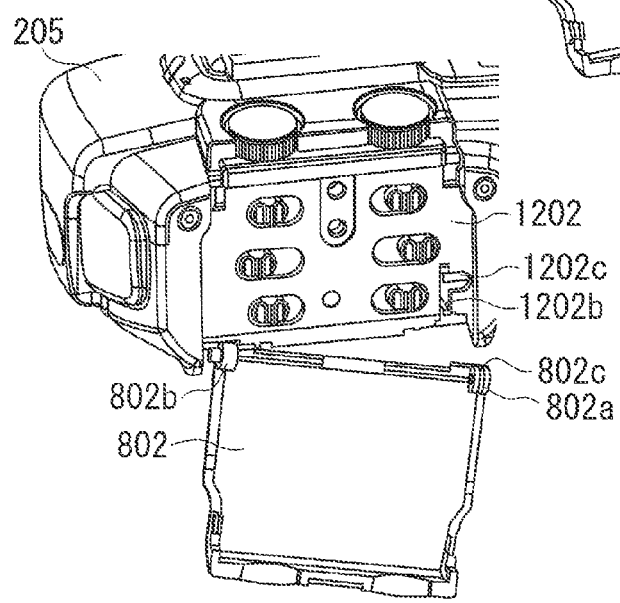

Furthermore, the shaft 1701 is pulled out towards the front of the video camera by picking up the shaft 1701 at the fixed portion 1701b thereof, so that the shaft portion 1701a of the shaft 1701 is removed out of the through hole 802a1 and the shaft hole of the bulge-shaped portion 205b. After the shaft 1701 is removed, the cover member 802 can be removed by turning the cover member 802 around the hinge 802b of the cover member 802, as illustrated in FIG. 21C.

The cover member 802 can be attached by executing the above-described operation in the reversed order.

According to an exemplary embodiment of the present invention, even if the cover member is in the closed state, the cover member covers only a side surface of the dial member without covering an upper surface of the dial member. Accordingly, a user can easily view a current setting value. In addition, it is not necessary to increase the size of the imaging apparatus because the cover member covers only the side surface of the dial member even when the cover member is in the closed state. While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-183273 filed Aug. 18, 2010, which is hereby incorporated by reference herein in its entirety.

What is claimed is:

1. An imaging apparatus comprising: an operation member located on a first surface of the imaging apparatus; a dial member located on a second surface of the imaging apparatus different from the first surface and configured to set a setting value by rotating; and a cover member configured to move between an open state and a closed state, wherein a level scale is provided on a top surface of the dial member, wherein a cover portion is provided on an edge of the cover member, and the cover portion has a concave arc shape, wherein in a case where the cover member is in the closed state, the cover member covers the operation member so that the operation member cannot be operated, and wherein in a case where the cover member is in the closed state, the cover portion of the cover member covers a side surface of the dial member and the cover portion of the cover member does not cover the top surface of the dial member so that the level scale is visible.

2. The imaging apparatus according to claim 1, wherein the dial member is located on the second surface so that the top surface of the dial member is lower than the second surface.

3. The imaging apparatus according to claim 1, wherein an indented shape portion is provided on a side surface of the dial member, and wherein in a case where the cover member is in the closed state, the cover portion engages with the indented shape portion of the dial member.

4. The imaging apparatus according to claim 1, wherein the dial member is used to adjust a level of an operation for recording audio information.

5. The imaging apparatus according to claim 1, further comprising a handle located on an upper surface of the imaging apparatus and extending in a longitudinal direction of the imaging apparatus, wherein an audio unit is arranged at a front edge of the handle, wherein the operation member is located on a first surface of the audio unit, and wherein the dial member is located on a second surface of the audio unit.

6. The imaging apparatus according to claim 1, wherein in a case when the cover member is in the closed state, the cover portion is interlocked with the side surface of the dial member so that the dial member cannot be rotated.

7. An imaging apparatus comprising:
an external connector to which an external microphone is configured to be connected;
an operation member located on a first surface of the imaging apparatus opposite a surface on which the external connector is located;
a dial member, located on a second surface of the imaging apparatus different from the first surface and the surface on which the external connector is located, configured to set a setting value by rotating; and
a cover member configured to move between an open state and a closed state,
wherein a level scale is provided on a top surface of the dial member,
wherein a cover portion is provided on an edge of the cover member, and the cover portion has a concave arc shape,
wherein in a case where the cover member is in the closed state, the cover member covers the operation member so that the operation member cannot be operated, and
wherein in a case where the cover member is in the closed state, the cover portion of the cover member covers a side surface of the dial member and the cover portion of the cover member does not cover the top surface of the dial member so that the level scale is visible.

8. The imaging apparatus according to claim 7, wherein an indented shape portion is provided on a side surface of the dial member, and wherein in a case where the cover member is in the closed state, the cover portion engages with the indented shape portion of the dial member.

9. The imaging apparatus according to claim 7, wherein in a case where the cover member is in the closed state, the cover portion is interlocked with the side surface of the dial member so that the dial member cannot be rotated.

10. An electric apparatus comprising:
an operation member located on a first surface of the electric apparatus;
a dial member located on a second surface of the electric apparatus different from the first surface and configured to set a setting value by rotating, and
a cover member configured to move between an open state and a closed state,
wherein a level scale is provided on a top surface of the dial member,
wherein a cover portion is provided on an edge of the cover member and the cover portion has a concave arc shape,
wherein in a case where the cover member is in the closed state, the cover member covers the operation member so that the operation member cannot be operated, and
wherein in a case when the cover member is in the closed state, the cover portion of the cover member covers a side surface of the dial member and the cover portion of the cover member does not cover the top surface of the dial member so that the level scale is visible.

11. The electric apparatus according to claim 10, wherein an indented shape portion is provided on a side surface of the dial member, and wherein in a case where the cover member is in the closed state, the cover portion engages with the indented shape portion of the dial member.

12. The electric apparatus according to claim 10, wherein in a case where the cover member is in the closed state, the cover portion is interlocked with the side surface of the dial member so that the dial member cannot be rotated.

* * * * *